(12) United States Patent
Fukui

(10) Patent No.: US 7,800,991 B2
(45) Date of Patent: Sep. 21, 2010

(54) OPTICAL DISK DEVICE

(75) Inventor: Toshiaki Fukui, Daito (JP)

(73) Assignee: Funai Electric Co., Ltd., Osaka (JP)

(*) Notice: Subject to any disclaimer, the term of this patent is extended or adjusted under 35 U.S.C. 154(b) by 501 days.

(21) Appl. No.: 11/985,634

(22) Filed: Nov. 16, 2007

(65) Prior Publication Data

US 2008/0117735 A1 May 22, 2008

(30) Foreign Application Priority Data

Nov. 17, 2006 (JP) .............................. 2006-311039

(51) Int. Cl.
G11B 7/00 (2006.01)
(52) U.S. Cl. ................... 369/44.29; 369/44.21
(58) Field of Classification Search .............. 369/44.29,
369/44.35, 44.27, 44.26, 44.32, 44.15, 44.17,
369/44.21, 94, 44.28
See application file for complete search history.

(56) References Cited

U.S. PATENT DOCUMENTS

| | | | | |
|---|---|---|---|---|
| 6,011,762 A * | 1/2000 | Watanabe et al. | ........ | 369/44.27 |
| 6,151,280 A * | 11/2000 | Naohara et al. | .......... | 369/44.27 |
| 6,628,580 B1 * | 9/2003 | Kishimoto et al. | ....... | 369/44.28 |
| 6,865,141 B2 * | 3/2005 | Tada et al. | ............... | 369/44.27 |
| 2003/0198149 A1 * | 10/2003 | Kuwayama et al. | ...... | 369/44.21 |
| 2004/0156294 A1 * | 8/2004 | Watanabe et al. | ............. | 369/94 |
| 2004/0196769 A1 * | 10/2004 | Nakano et al. | ........... | 369/53.28 |
| 2007/0041283 A1 * | 2/2007 | Tateishi | ................... | 369/30.04 |
| 2009/0028028 A1 * | 1/2009 | Watanabe et al. | ............. | 369/94 |

FOREIGN PATENT DOCUMENTS

| | | | |
|---|---|---|---|
| JP | 10143871 A | * | 5/1998 |
| JP | 2005-071395 | | 3/2005 |
| JP | 2005-332554 | | 12/2005 |

OTHER PUBLICATIONS

Patent Abstracts of Japan, Publication No. 2005-071395, Publication Date: Mar. 17, 2005, 1 page.
Patent Abstracts of Japan, Publication No. 2005-332554, Publication Date: Dec. 2, 2005, 1 page.

* cited by examiner

Primary Examiner—Thang V Tran
(74) Attorney, Agent, or Firm—Osha Liang LLP

(57) ABSTRACT

There is provided an optical disk device that performs a focus jump operation in a stable and prompt manner. The optical disk device includes an objective lens, a light-detecting element, a lens holder, a shaft member configured to penetrate a hole, a focus drive mechanism, a focus drive circuit, a tracking rotation mechanism, a tracking drive circuit, and a control circuit. The control circuit includes a drive control portion, a wobble control portion, and a switch portion. The drive control portion generates a control signal to be input to the focus drive circuit and a control signal to be input to the tracking drive circuit. The wobble control portion generates a control signal indicating that a current value should fluctuate. During a period of focus jump, the switch portion introduces into the tracking drive circuit the control signal generated by the wobble control portion.

5 Claims, 7 Drawing Sheets

OPTICAL DISK DEVICE

BACKGROUND OF THE INVENTION

1. Field of the Invention

The present invention relates to an optical disk device, and particularly relates to an optical disk device including a mechanism that moves light beams to a working position.

2. Description of the Background Art

As to an optical disk device, Japanese Patent Laying-Open No. 2005-071395 discloses an optical disk device provided with a shaft sliding-type optical pick-up. The optical pick-up has a semiconductor laser, an objective lens, a light-detecting element, a lens holder holding the objective lens, a guide shaft fitted into a bearing portion provided at the lens holder and capable of sliding the lens holder in a direction parallel to an optical axis of the objective lens, a focusing servomechanism including a focusing coil, a yoke, and a permanent magnet, and a tracking servomechanism including a tracking coil, a yoke, and a permanent magnet. The semiconductor laser outputs laser beams to the optical disk. The objective lens focuses the laser beams output from the semiconductor laser onto a data-recording surface of the optical disk. The light-detecting element receives light reflected from the optical disk and converts the light into an electrical signal. The guide shaft journals the lens holder rotatably in a direction orthogonal to the optical axis. The focusing servomechanism moves the lens holder in a direction parallel to the optical axis. The tracking coil rotates the lens holder in the direction orthogonal to the optical axis. For a focus-on operation, the optical pick-up drives the focusing coil to perform the focus-on operation, while repetitively causing a slight displacement of the bearing portion of the lens holder with respect to the guide shaft in the direction orthogonal to the optical axis by applying to the tracking coil a prescribed voltage and a wobble signal of a triangular waveform having a prescribed frequency. The focus-on operation is thereby stabilized.

According to the invention disclosed in Japanese Patent Laying-Open No. 2005-071395, the focus-on operation can be stabilized.

Japanese Patent Laying-Open No. 2005-332554 discloses a reproduction device reproducing a recording medium having a plurality of recording layers. The reproduction device is provided with optical head means, shaft sliding-type focus actuator means, focus servo means, and focus jump control means. The optical head means applies laser light to each of the recording layers by using an objective lens as an output terminal, detects information on light reflected from each of the recording layers, and reads information recorded on each of the recording layers. The focus actuator means holds the objective lens movably in a direction toward and from the recording medium. The focus servo means generates a focus servo driving signal based on a focus error signal obtained from the reflected light information read by the optical head means, and drives the focus actuator means such that the laser light is kept in a focused state with respect to a recording layer to be reproduced. The focus jump control means generates a kick signal initiating a focus jump movement caused by the focus actuator means, and a brake signal terminating the focus jump movement, as focus jump driving signals for bringing a transition from a focused state with respect to a recording layer to a focused state with respect to another recording layer. The focus jump control means generates the kick signal as a signal having its kick driving force increased from an initial value.

According to the invention disclosed in Japanese Patent Laying-Open No. 2005-332554, a stable focus jump operation can be maintained.

However, the invention disclosed in Japanese Patent Laying-Open No. 2005-071395 has a problem of difficulty in stabilizing the focus jump operation (hereinafter referred to as "focus jump"). The "focus jump" refers to a transition from a state where recording or reading can be performed on a recording layer, to a state where recording or reading can be performed on another recording layer, when information is recorded on or read from an optical disk having a plurality of recording layers.

In the invention disclosed in Japanese Patent Laying-Open No. 2005-071395, a control portion performs a process of applying a wobble signal to the tracking coil in the focus-on operation. In this case, no control is required for the tracking coil until just before the focus-on operation. This makes it easy for the control portion to control the tracking coil in a prompt manner.

In contrast, in the case of the focus jump operation, control over the tracking coil may be required until just before the focus jump operation. This is because the optical pick-up operates until just before the focus jump. When the optical pick-up operates until just before the focus jump, it is difficult to abruptly modify the control over the tracking coil. This is because the time required for a process for modifying the control over the tracking coil is extremely short, while the time permitted for modifying the control over the tracking coil is much shorter. The time required for the focus jump is merely a few microseconds.

The invention disclosed in Japanese Patent Laying-Open No. 2005-332554 has a problem of prolonged time required for the focus jump.

SUMMARY OF THE INVENTION

The present invention is made to overcome the above-described problems. An object of the present invention is to provide an optical disk device capable of performing a focus jump operation in a stable and prompt manner.

To overcome the above-described problems, an optical disk device according to an aspect of the present invention includes: an objective lens configured to collect laser beams on a data-recording surface of an optical disk; a light-detecting element configured to receive light reflected from the optical disk, and convert the received light into an electrical signal; a lens holder having a hole with a central axis parallel to an optical axis of the objective lens, and configured to hold the objective lens; a shaft member configured to penetrate the hole; a focus drive mechanism having a focusing coil and a permanent magnet, and configured to drive the lens holder along the central axis; a focus drive unit configured to supply to the focusing coil electric power having a current value corresponding to a first control signal input thereto; a tracking rotation mechanism having a tracking coil and a permanent magnet, and configured to rotate the lens holder in a direction orthogonal to the central axis; a tracking drive unit configured to supply to the tracking coil electric power having a current value corresponding to a second control signal input thereto; and a control device configured to control the focus drive unit and the tracking drive unit. The control device includes a drive control circuit configured to generate the first control signal to be input to the focus drive unit and including information on a direction of a current flowing through the focusing coil, and the second control signal to be input to the tracking drive unit, a signal generation circuit configured to generate a waveform signal, a conversion circuit configured to convert a waveform of the waveform signal in accordance with the direction of the current flowing through the focusing coil, and a switching circuit configured to, during a period of focus jump, switch an input source of the second control signal to be introduced into the tracking drive unit between the first control signal generated by the drive control circuit and the waveform signal having the waveform converted by the conversion circuit, such that the waveform signal having the waveform converted by the conversion circuit is introduced into the tracking drive unit.

An optical disk device according to another aspect of the present invention includes: an objective lens configured to collect laser beams on a data-recording surface of an optical disk; a light-detecting element configured to receive light reflected from the optical disk, and convert the received light into an electrical signal; a lens holder having a hole with a central axis parallel to an optical axis of the objective lens, and configured to hold the objective lens; a shaft member configured to penetrate the hole; a focus drive mechanism having a focusing coil and a permanent magnet, and configured to drive the lens holder along the central axis; a focus drive unit configured to supply to the focusing coil electric power having a current value corresponding to a first control signal input thereto; a tracking rotation mechanism having a tracking coil and a permanent magnet, and configured to rotate the lens holder in a direction orthogonal to the central axis; a tracking drive unit configured to supply to the tracking coil electric power having a current value corresponding to a second control signal input thereto; and a control device configured to control the focus drive unit and the tracking drive unit. The control device includes a drive control circuit configured to generate the first control signal to be input to the focus drive unit and the second control signal to be input to the tracking drive unit, a wobble control circuit configured to generate a third control signal to be input to the tracking drive unit and indicating that the current value should fluctuate, and a switching circuit configured to, during a period of focus jump, switch an input source of the second control signal to be introduced into the tracking drive unit between the first control signal generated by the drive control circuit and the third control signal generated by the wobble control circuit, such that the third control signal generated by the wobble control circuit is introduced into the tracking drive unit.

Preferably, the first control signal generated by the drive control circuit includes information on a direction of a current flowing through the focusing coil. The wobble control circuit includes a circuit configured to generate the third control signal indicating that the current value should fluctuate in a fluctuation range corresponding to the direction of the current flowing through the focusing coil.

Preferably, the wobble control circuit includes a signal generation circuit configured to generate a waveform signal, and a conversion circuit configured to convert a waveform of the waveform signal in accordance with the direction of the current flowing through the focusing coil.

Preferably, the wobble control circuit includes a circuit configured to generate the third control signal indicating that the current value should fluctuate in a fixed cycle.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
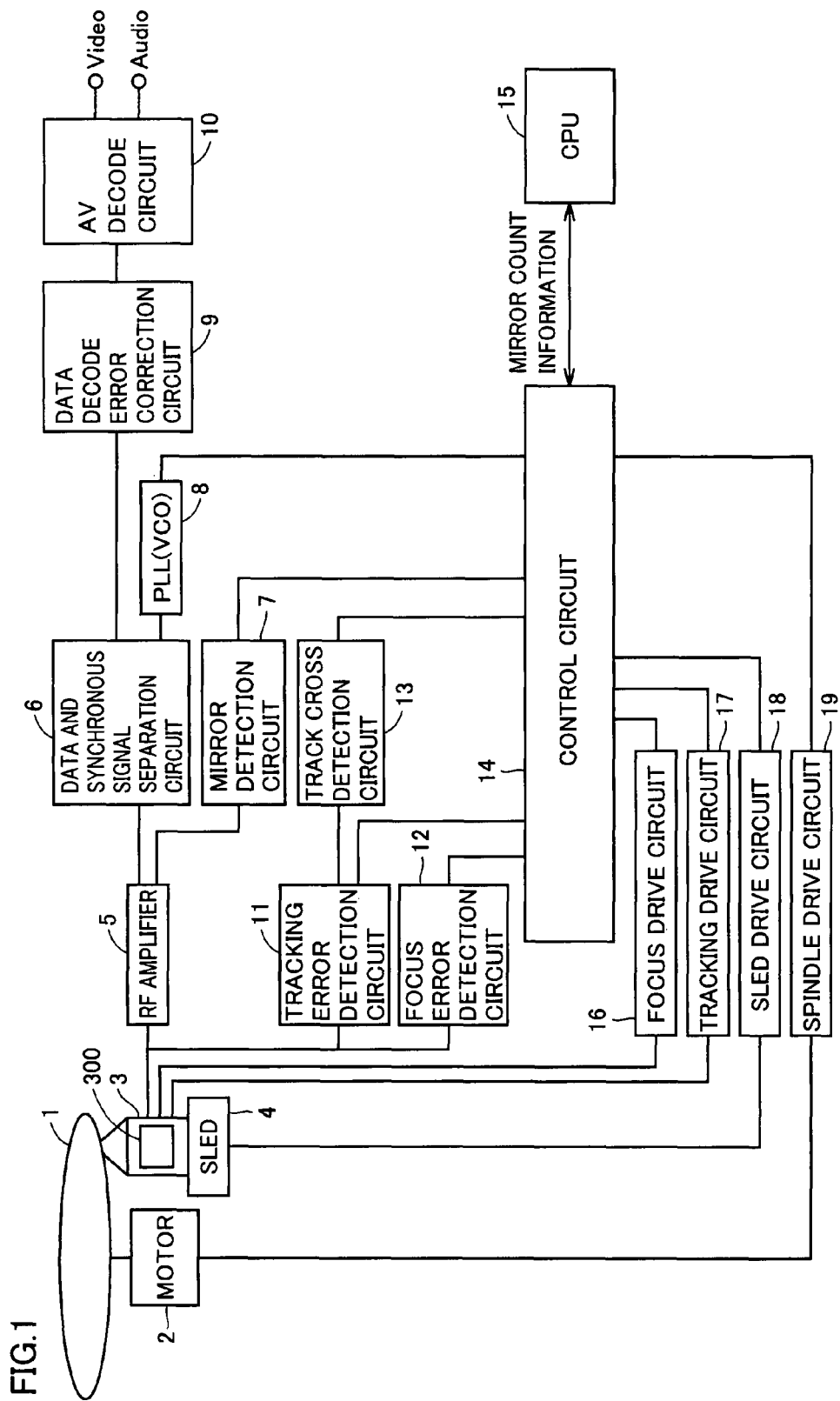
FIG. 1 is a configurational diagram of an optical disk device according to an embodiment of the present invention.

An embodiment of the present invention will hereinafter be described with reference to the drawings. In the following description, the same parts are provided with the same reference characters, and have the same names and functions as well. Accordingly, the detailed description thereof will not be repeated.

FIG. 1 shows a configuration of an optical disk device according to the present embodiment. In FIG. 1, the optical disk device is provided with an optical pick-up 3 that emits laser light for reproducing information recorded on an optical disk 1 serving as a recording medium and receives light reflected from optical disk 1, a spindle motor 2 configured to rotate optical disk 1, a spindle drive circuit 19 configured to drive spindle motor 2, a tracking drive circuit 17 configured to drive a tracking rotation mechanism that performs tracking servo of optical pick-up 3, a focus drive circuit 16 configured to drive a focus drive mechanism that performs focus servo of optical pick-up 3, a sled 4 configured to move optical pick-up 3 in a radial direction of optical disk 1, and a sled drive circuit 18 configured to drive sled 4. Optical pick-up 3 has a light-detecting element 300 configured to receive light reflected from optical disk 1 and convert the received light into an electrical signal.

Furthermore, the optical disk device is provided with an RF amplifier 5 configured to have a reproducing signal (reading signal) input thereto from optical pick-up 3 and generate and amplify a Radio Frequency (RF) signal from the reproducing signal when optical disk 1 is reproduced, a PLL 8 including a Voltage Controlled Oscillator (VCO), a data and synchronous signal separation circuit 6 configured to have the RF signal input thereto from RF amplifier 5 and separate data and a synchronous signal, a data decode error correction circuit 9 that performs error check by having the data, which has been separated by data and synchronous signal separation circuit 6, input thereto and decoded, and when the data has an error, outputs correct data by performing error correction, and an Audio Visual (AV) decode circuit 10 configured to have the correct data input thereto from data decode error correction circuit 9, decode the correct data, and output video and audio signals.

Furthermore, the optical disk device is provided with a mirror detection circuit 7 configured to detect a mirror signal included in the RF signal from RF amplifier 5 and indicative of a mirror surface having no track on optical disk 1, and output a mirror pulse, a tracking error detection circuit 11 configured to detect a tracking error signal included in the reproducing signal from optical pick-up 3, a focus error detection circuit 12 configured to detect a focus error signal included in the reproducing signal from optical pick-up 3, and a track cross detection circuit 13 configured to detect a track cross based on the tracking error signal from tracking error detection circuit 11 and output a track pulse.

Furthermore, the optical disk device is provided with a control circuit 14 configured to control each of the above-described circuits in accordance with a Central Processing Unit (CPU) 15 that performs the process of the entire device.

Figure 2:
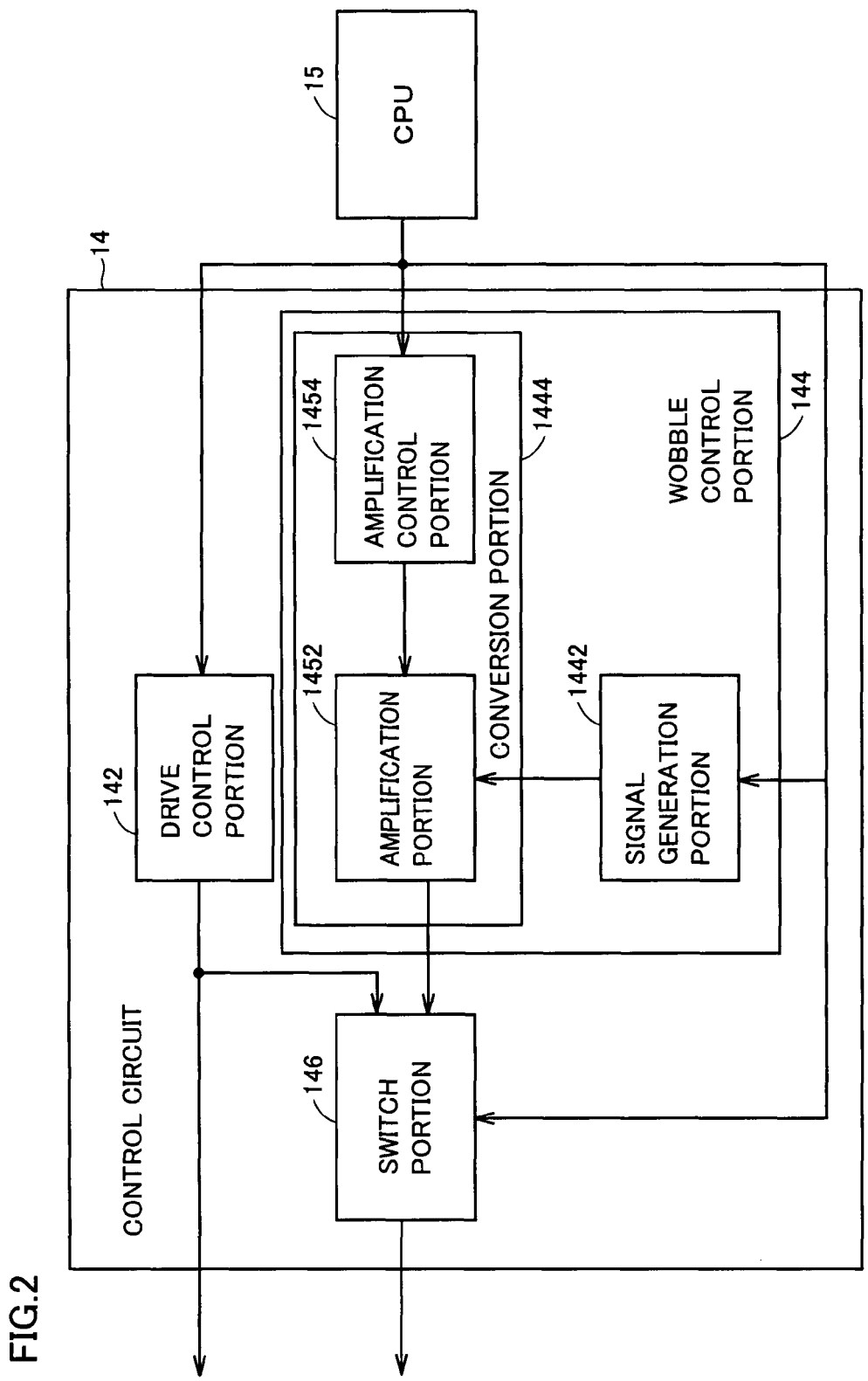
FIG. 2 is a functional block diagram of functions for which a control circuit according to the embodiment of the present invention is responsible.

FIG. 2 is a functional block diagram of functions for which control circuit 14 is responsible. Note that only the functions relating to focus jump are illustrated out of the functions for which control circuit 14 is responsible. With reference to FIG. 2, control circuit 14 includes a drive control portion 142, a wobble control portion 144, and a switch portion 146. Drive control portion 142 generates a control signal to be input to focus drive circuit 16, and a control signal to be input to tracking drive circuit 17. In FIG. 2, an arrow directly extending from drive control portion 142 to the outside of control circuit 14 shows that the control signal generated by drive control portion 142 is output to focus drive circuit 16. The control signal to be input to focus drive circuit 16 includes information on a direction of a current flowing through a focusing coil 45 described below. Wobble control portion 144 generates a control signal to be input to tracking drive circuit 17. The control signal indicates that a current value should fluctuate. Switch portion 146 switches an input source of the control signal to be introduced into tracking drive circuit 17 between the control signal generated by drive control portion 142 and the control signal generated by wobble control portion 144. Switch portion 146 switches the input source of the control signal during a period of focus jump such that the control signal generated by wobble control portion 144 is introduced into tracking drive circuit 17. In FIG. 2, an arrow directly extending from switch portion 146 to the outside of control circuit 14 represents that one of the control signal generated by drive control portion 142 and the control signal generated by wobble control portion 144 is output to tracking drive circuit 17.

Wobble control portion 144 includes a signal generation portion 1442 and a conversion portion 1444. Signal generation portion 1442 generates a waveform signal. A waveform of the generated signal may be rectangular or a sine curve. In the present embodiment, however, a waveform of the generated signal is triangular. Conversion portion 1444 converts a waveform of the waveform signal in accordance with the direction of a current flowing through focusing coil 45. The waveform signal may be converted such that its frequency is modified. In the present embodiment, however, the waveform signal is converted such that its wave height is modified. This is because, in the present embodiment, a current value of the current supplied by tracking drive circuit 17 to tracking coils 46 and 47, which will be described below, varies in accordance with the wave height of the control signal to be input thereto.

Conversion portion 1444 includes an amplification portion 1452 and an amplification control portion 1454. Amplification portion 1452 amplifies the waveform signal generated by signal generation portion 1442. The wave height of the waveform signal is thereby increased. In the present embodiment, amplification portion 1452 includes two types of circuits configured to amplify the waveform signal, and a switch configured to switch a path such that the input signal passes through one of the circuits above. The circuits and switch are not shown. The two types of circuits configured to amplify the waveform signal have amplification factors different from each other. This means that switching of the path causes a change in amplification factor with which amplification portion 1452 amplifies the waveform signal. Amplification control portion 1454 controls an increase rate of the wave height. In the present embodiment, amplification control portion 1454 turns on or off the switch embedded in amplification portion 1452. Amplification control portion 1454 modifies the increase rate of the wave height in accordance with a direction of the current flowing through focusing coil 45.

Figure 3:
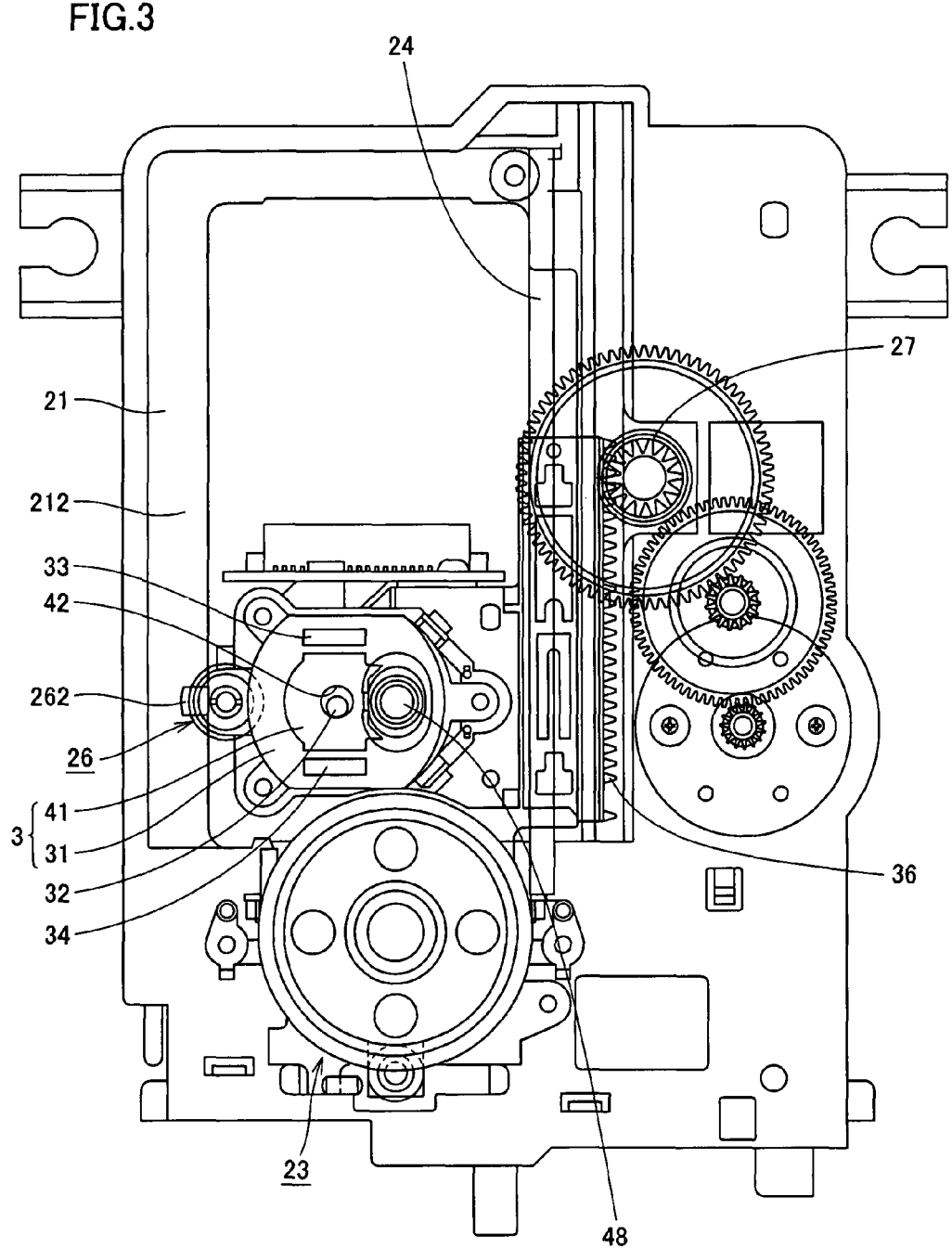
FIG. 3 is a diagram showing a state where a lens holder according to the embodiment of the present invention is supported by a lens holder-supporting portion.
Figure 4:
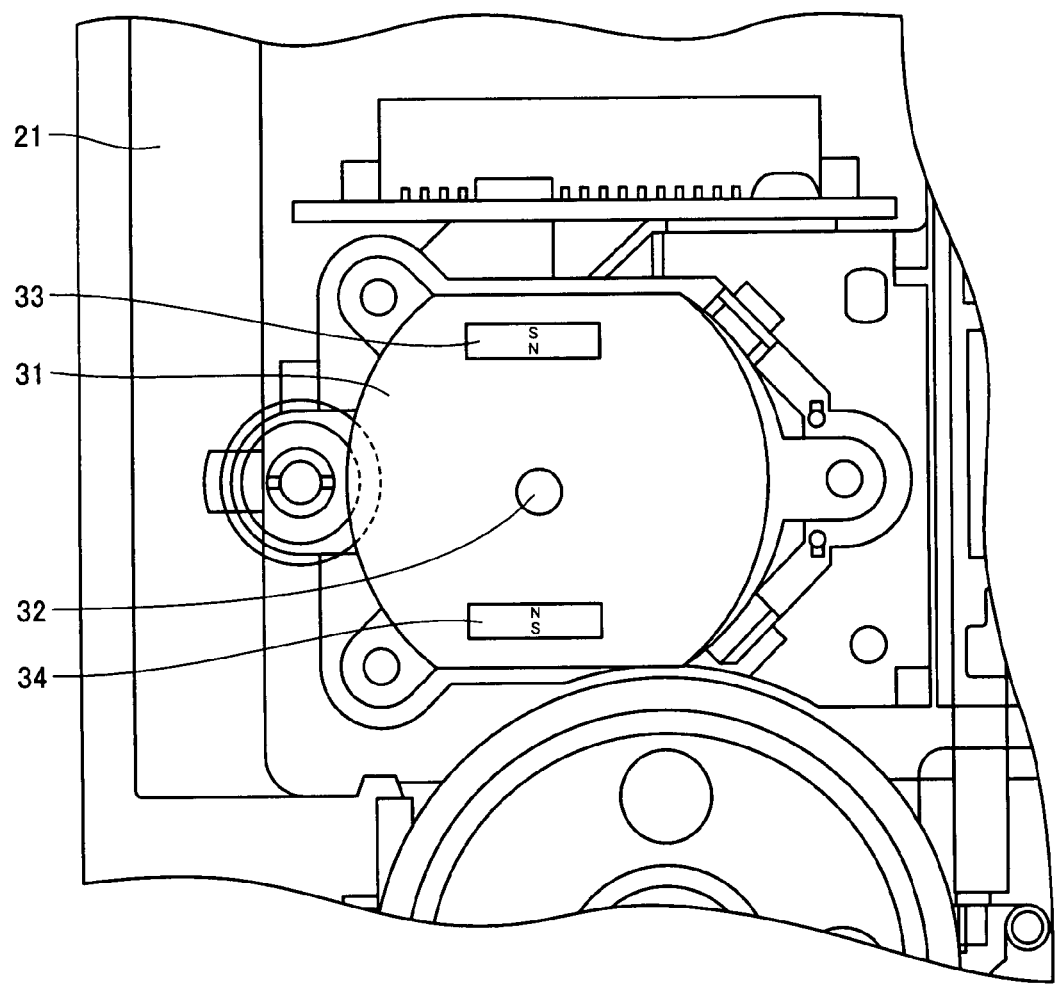
FIG. 4 is a diagram showing the lens holder-supporting portion according to the embodiment of the present invention.

FIGS. 3 and 4 are plan views each representing a specific configuration of optical pick-up 3 and others in the present embodiment. FIG. 3 shows a state where a lens holder 41 is supported by a lens holder-supporting portion 31, while FIG. 4 shows lens holder-supporting portion 31 with lens holder 41 removed from lens holder-supporting portion 31. Lens holder 41 may be formed such that it is completely detachable from the lens holder-supporting portion 31 as shown in FIG. 4, or may be coupled thereto by a flexible member with its movements for tracking and focusing being allowed.

In this optical disk device, optical pick-up 3 engages with a slide shaft 24 to freely turn about and freely move along the slide shaft 24. Although one slide shaft 24 is shown in FIG. 3, the present invention is of course applicable to a type of the device provided with two slide shafts 24. Optical pick-up 3 is provided with lens holder 41 and lens holder-supporting portion 31 configured to support lens holder 41. A guide shaft 32 stands erect from the floor surface of the lens holder-supporting portion 31, and penetrates a slide hole 42 of lens holder 41.

The above-described optical pick-up 3 is driven by a rack 36 and a pinion 27 to move along slide shaft 24. Optical disk 1 is mounted on a turntable 23. Light (laser) beams pass through an objective lens 48 held by lens holder 41 and irradiate optical disk 1 located above objective lens 48. There is provided a beam angle adjustment mechanism, as described below, to make the beams incident vertically upon optical disk 1 at this time. Specifically, lens holder-supporting portion 31 has an end engaged with guide shaft 32, and another end engaged with flange members 262 attached to a male screw member 26 to sandwich a rim 212 of a chassis 21 from the top and the bottom. Manipulation of male screw member 26 to change the degree of screw-in can change a distance from rim 212 of chassis 21 to the surface on which lens holder-supporting portion 31 is mounted, to thereby change a tilt of lens holder 41.

Figure 5:
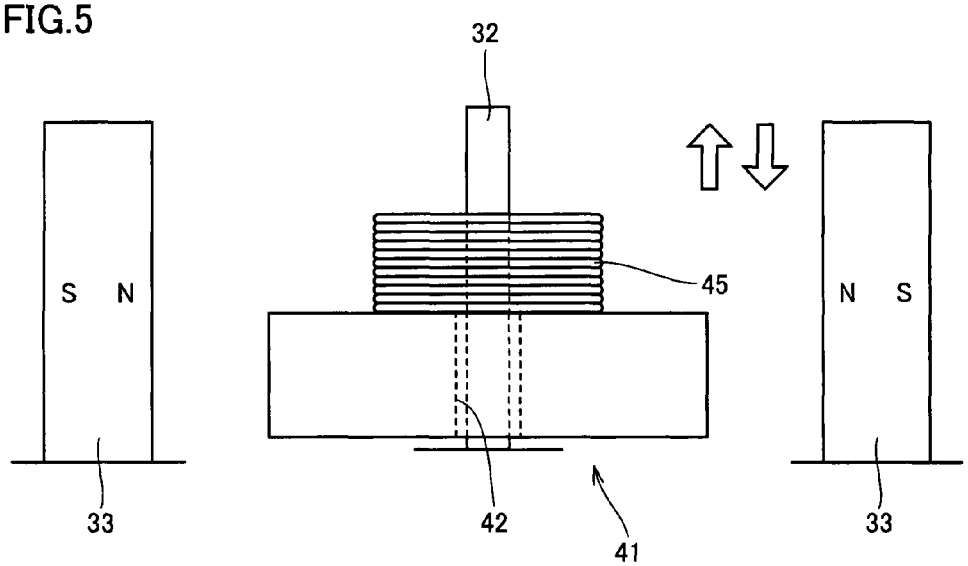
FIG. 5 is a front view showing a state where a guide shaft is inserted into a slide hole in the lens holder according to the embodiment of the present invention.

FIG. 5 is a front view showing a state where guide shaft 32 is introduced into slide hole 42 of lens holder 41. A first permanent magnet 33 and a second permanent magnet 34 are located with their magnetic poles of the same polarity opposite to each other, sandwiching lens holder 41. Both of first and second permanent magnets 33 and 34 are secured to lens holder-supporting portion 31, as is guide shaft 32, and stand erect from the floor surface of lens holder-supporting portion 31. Lens holder 41 is provided with a focusing coil 45 wound around slide hole 42. When a current is made to flow through focusing coil 45 for focusing adjustment, magnetic flux is generated from focusing coil 45, which magnetic flux is attracted to or repelled by magnetic flux from the permanent magnets in accordance with a direction of the current. In other words, lens holder 41 receives upward or downward force in accordance with the direction of the current. Since the pair of permanent magnets has their magnetic poles of the same polarity opposite to each other, when a current is made to flow through focusing coil 45 as described above, stress biased upward or downward would not occur. This prevents an adverse effect on focusing.

Figure 6:
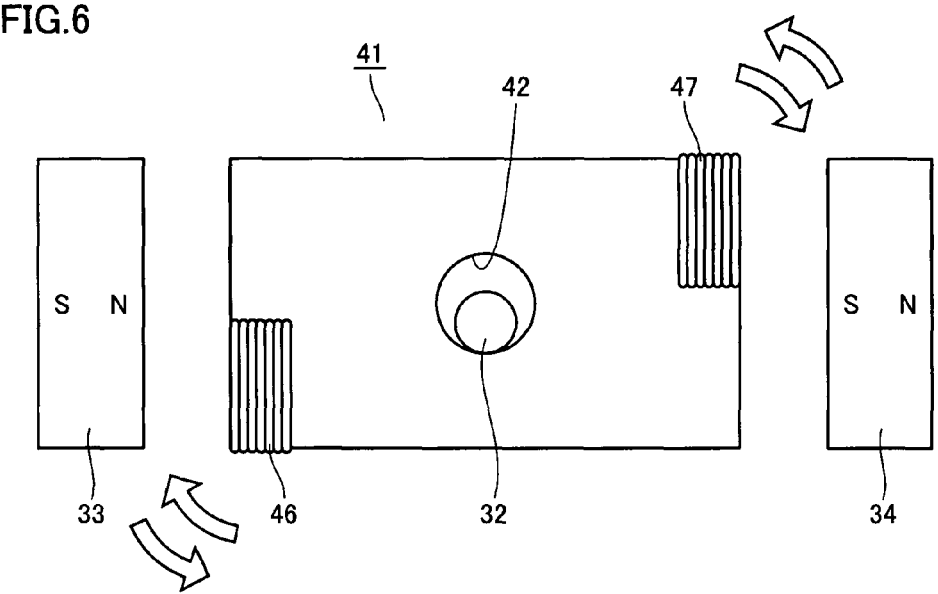
FIG. 6 is a plan view of the lens holder according to the embodiment of the present invention.

FIG. 6 is a plan view of lens holder 41. Tracking coils 46 and 47 are provided on the respective sides of lens holder 41, displaced from the front positions of the permanent magnets. When a current is made to flow through tracking coils 46 and 47 in tracking adjustment, magnetic flux is generated from tracking coils 46 and 47. The magnetic flux is attracted to or repelled by the magnetic flux from the permanent magnets in accordance with the direction of the current. In this case again, since the pair of permanent magnets has their magnetic poles of the same polarity opposite to each other, the turning direction is not biased in one direction. As described above, the magnetic flux from first permanent magnet 33 and second permanent magnet 34 is used for driving of both focusing and tracking described above.

Figure 7:
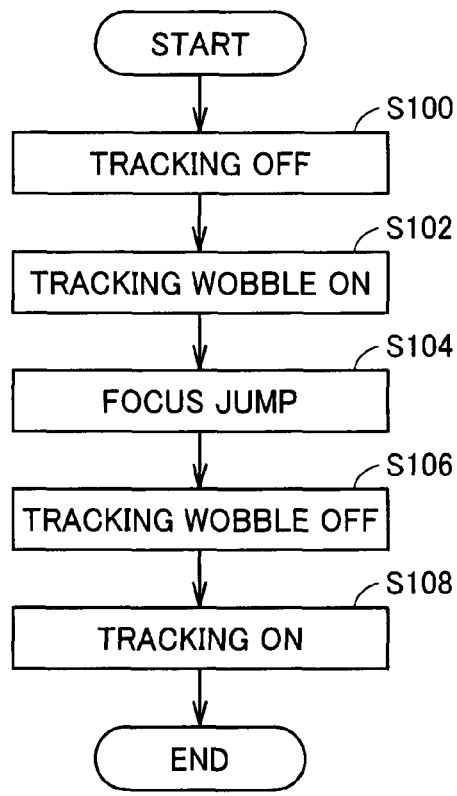
FIG. 7 is a flowchart showing a procedure for controlling a focus jump process according to the embodiment of the present invention.

With reference to FIG. 7, a program executed in control circuit 14 performs control as to focus jump, as described below.

In step S100, CPU 15 outputs to control circuit 14 a control signal for halting control over tracking drive circuit 17. Drive control portion 142 halts outputting of the control signal to tracking drive circuit 17. Until this time point, the control signal that can be output by switch portion 146 is the one generated by drive control portion 142.

In step S102, switch portion 146 switches an input source of the control signal to be introduced into tracking drive circuit 17. From that time on, the control signal generated by wobble control portion 144 is introduced into tracking drive circuit 17. Concurrently with the switching, signal generation portion 1442 initiates generation of the waveform signal. Amplification control portion 1454 turns on or off a switch, not shown, embedded in amplification portion 1452, in accordance with the direction of the current flowing through focusing coil 45. This results in that the control signal to be introduced into tracking drive circuit 17 indicates that a current value should fluctuate. In accordance with the signal, tracking drive circuit 17 causes a current value of the current supplied to tracking coils 46, 47 to fluctuate in a fixed cycle. Note that tracking drive circuit 17 may of course cause the current value to fluctuate such that it repeatedly fluctuates without a specific cycle. Since the current value fluctuates, lens holder 41 wobbles. In the present embodiment, such a wobble of lens holder 41 is referred to as a "tracking wobble". In the present embodiment, initiation of the tracking wobble is referred to as "tracking wobble on".

In step S104, CPU 15 outputs a control signal to control circuit 14. The control signal indicates that lens holder 41 should be made to perform focus jump. Drive control portion 142 outputs a control signal to focus drive circuit 16. When the control signal is input to focus drive circuit 16, focus drive circuit 16 causes a current to flow through focusing coil 45 in a direction corresponding to the information included in the control signal output by drive control portion 142. This causes lens holder 41 to move along guide shaft 32, and hence the focus jump is implemented.

In step S106, switch portion 146 switches the input source of the control signal to be introduced into tracking drive circuit 17. From that time on, the control signal generated by drive control portion 142 is introduced into tracking drive circuit 17. Concurrently with the switching, signal generation portion 1442 halts the generation of the waveform signal. This automatically causes halting of amplification of the waveform signal by amplification portion 1452. Since the control signal from wobble control portion 144 is no longer introduced, the tracking wobble halts. In the present embodiment, the halting of the tracking wobble is referred to as "tracking wobble off".

In step S108, drive control portion 142 resumes generating the control signal to be introduced into tracking drive circuit 17. This means that tracking of lens holder 41 is performed as needed.

There will be described an operation of the optical disk device based on the structure and flowchart above.

Drive control portion 142 halts outputting of the control signal to tracking drive circuit 17 (step S100). When outputting of the control signal is halted, switch portion 146 switches the input source of the control signal to be introduced into tracking drive circuit 17. Concurrently with the switching, wobble control portion 144 initiates the generation of the control signal. This initiates the tracking wobble (step S102).

Note that an oscillation frequency of lens holder 41 during the tracking wobble needs to be made significantly higher than that during focus search. An optimal frequency varies depending on the structure and others of lens holder 41. In the present embodiment, the oscillation frequency of lens holder 41 is set to be 4 kHz.

When the tracking wobble is initiated, drive control portion 142 outputs a control signal to focus drive circuit 16. When the control signal is input to focus drive circuit 16, focus drive circuit 16 causes a current to flow through focusing coil 45 in a direction in accordance with the information included in the control signal output by drive control portion 142. The focus jump is thereby implemented (step S104).

When the focus jump is completed, switch portion 146 switches the input source of the control signal to be introduced into tracking drive circuit 17. Concurrently with the switching, signal generation portion 1442 halts the generation of the waveform signal. The tracking wobble is thereby halted (step S106).

When the tracking wobble is halted, drive control portion 142 resumes generating the control signal to be introduced into tracking drive circuit 17. This means that tracking of lens holder 41 is performed as needed (step S108).

As described above, the optical disk device according to the present embodiment switches the input source of the control signal to be introduced into tracking drive circuit 17 in focus jump. Since the tracking wobble is initiated by switching the input source of the control signal, it becomes easy to control tracking coils 46 and 47 in a prompt manner even in a short period of time such as the time required for focus jump. Furthermore, the tracking wobble causes lens holder 41 to move by wobbling, and hence it is also possible to avoid the case where lens holder 41 continues to sit still. Since such a case is avoided, the focus jump operation can be performed in a stable and prompt manner.

Figure 8:
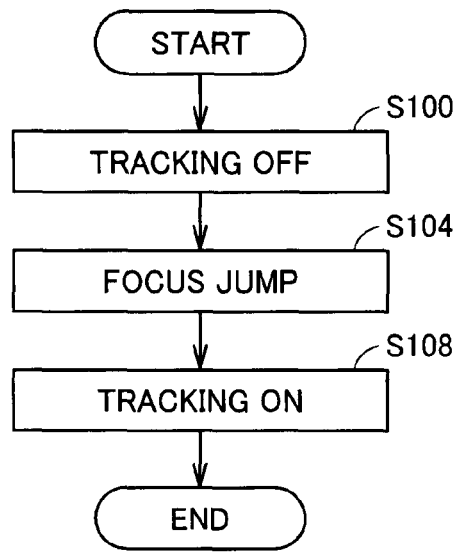
FIG. 8 is a flowchart showing a procedure for controlling a focus jump process in a general case.

FIG. 8 is a flowchart showing a procedure for controlling the focus jump in a general case. The focus jump is performed immediately after the control by drive control portion 142 over tracking drive circuit 17 is halted. Upon completion of the focus jump, the control by drive control portion 142 over tracking drive circuit 17 is immediately resumed.

Figure 9:
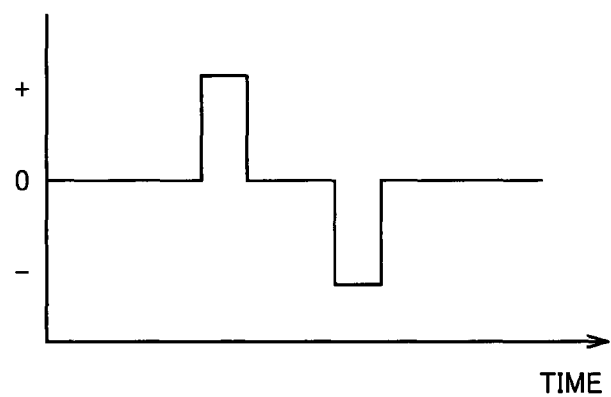
FIG. 9 is a diagram representing a progression of a set value of an acceleration of the lens holder.
Figure 10:
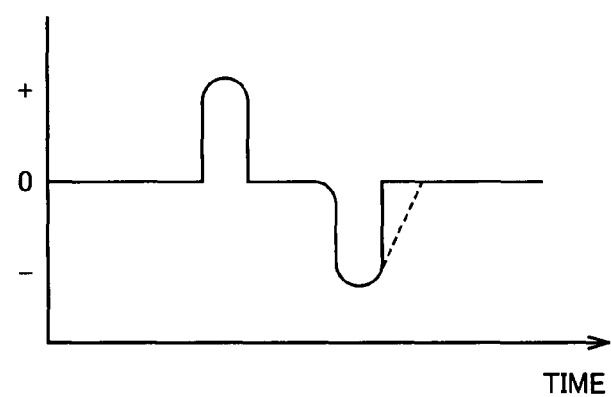
FIG. 10 is a first diagram representing a progression of a measured value of the acceleration when the lens holder is caught by the guide shaft.
Figure 11:
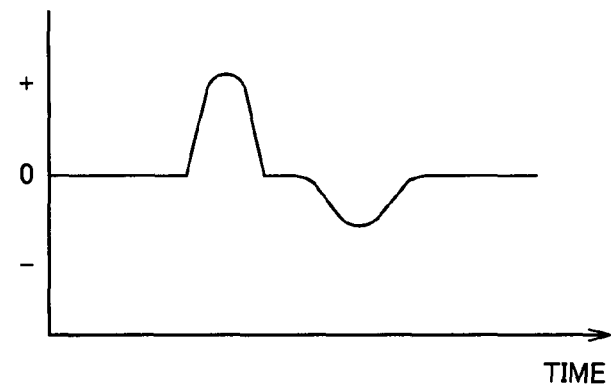
FIG. 11 is a second diagram representing a progression of a measured value of the acceleration when the lens holder is caught by the guide shaft.

In such a case, even if an attempt is made to change an acceleration of lens holder 41 as shown in FIG. 9, if lens holder 41 is caught by guide shaft 32 at an acceleration of zero, a focus error may not be sensed. If the focus error is not sensed, an acceleration becomes negative in a period where the acceleration should intrinsically be zero, as shown in FIG. 10, resulting in excessive movement of lens holder 41. Alternatively, if lens holder 41 is caught by guide shaft 32 during the focus jump, and if lens holder 41 fails to have sufficient speed as shown in FIG. 11, lens holder 41 may return. The distance between recording layers often differs between two optical disks. If such a difference exists, an effect on lens holder 41 owing to friction differs, and hence it is difficult to predict the degree of how the adverse effect as described above is caused.

In contrast, the optical disk device according to the present embodiment initiates the tracking wobble in the focus jump. This significantly lowers the possibility of lens holder 41 being caught by guide shaft 32 in the focus jump. Since such a possibility is lowered, the possibility of excessive movement of lens holder 41 or returning of lens holder 41 is also lowered. The possibility of such an adverse effect is also lowered. As a result, it is possible to provide an optical disk device capable of performing the focus jump operation in a stable and prompt manner.

Note that wobble control portion 144 may generate a control signal indicating that a current value should fluctuate, by a method different from the above-described method, in a modification of the present embodiment. An example of such a method is the one in which a plurality of waveform signal generation portions and a switch switching an input source of a waveform signal to be output to switch portion 146 in accordance with a direction of the current flowing through focusing coil 45 are combined to modify the waveform signal to be output, in accordance with the current flowing through focusing coil 45.

The optical disk device according to the present invention can perform the focus jump operation in a stable and prompt manner.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical disk device, comprising:
   an objective lens configured to collect laser beams on a data-recording surface of an optical disk;
   a light-detecting element configured to receive light reflected from said optical disk, and convert the received light into an electrical signal;
   a lens holder having a hole with a central axis parallel to an optical axis of said objective lens, and configured to hold said objective lens;
   a shaft member configured to penetrate said hole;
   a focus drive mechanism having a focusing coil and a permanent magnet, and configured to drive said lens holder along said central axis;
   a focus drive unit configured to supply to said focusing coil electric power having a current value corresponding to a first control signal input thereto;
   a tracking rotation mechanism having a tracking coil and a permanent magnet, and configured to rotate said lens holder in a direction orthogonal to said central axis;
   a tracking drive unit configured to supply to said tracking coil electric power having a current value corresponding to a second control signal input thereto; and
   a control device configured to control said focus drive unit and said tracking drive unit, wherein
   said control device includes
   a drive control circuit configured to generate said first control signal to be input to said focus drive unit and including information on a direction of a current flowing through said focusing coil, and said second control signal to be input to said tracking drive unit,
   a signal generation circuit configured to generate a waveform signal,
   a conversion circuit configured to convert a waveform of said waveform signal in accordance with the direction of the current flowing through said focusing coil, and
   a switching circuit configured to, during a period of focus jump, switch an input source of said second control signal to be introduced into said tracking drive unit between said first control signal generated by said drive control circuit and said waveform signal having the waveform converted by said conversion circuit, such that said waveform signal having the waveform converted by said conversion circuit is introduced into said tracking drive unit.

2. An optical disk device, comprising:
   an objective lens configured to collect laser beams on a data-recording surface of an optical disk;
   a light-detecting element configured to receive light reflected from said optical disk, and convert the received light into an electrical signal;
   a lens holder having a hole with a central axis parallel to an optical axis of said objective lens, and configured to hold said objective lens;
   a shaft member configured to penetrate said hole;
   a focus drive mechanism having a focusing coil and a permanent magnet, and configured to drive said lens holder along said central axis;
   a focus drive unit configured to supply to said focusing coil electric power having a current value corresponding to a first control signal input thereto;
   a tracking rotation mechanism having a tracking coil and a permanent magnet, and configured to rotate said lens holder in a direction orthogonal to said central axis;
   a tracking drive unit configured to supply to said tracking coil electric power having a current value corresponding to a second control signal input thereto; and
   a control device configured to control said focus drive unit and said tracking drive unit, wherein
   said control device includes
   a drive control circuit configured to generate said first control signal to be input to said focus drive unit and said second control signal to be input to said tracking drive unit,
   a wobble control circuit configured to generate a third control signal to be input to said tracking drive unit and indicate that the current value should fluctuate, and
   a switching circuit configured to, during a period of focus jump, switch an input source of said second control signal to be introduced into said tracking drive unit between said first control signal generated by said drive control circuit and said third control signal generated by said wobble control circuit, such that said third control signal generated by said wobble control circuit is introduced into said tracking drive unit.

3. The optical disk device according to claim 2, wherein said first control signal generated by said drive control circuit includes information on a direction of a current flowing through said focusing coil, and said wobble control circuit includes a circuit configured to generate said third control signal indicating that said current value should fluctuate in a fluctuation range corresponding to the direction of the current flowing through said focusing coil.

4. The optical disk device according to claim 3, wherein said wobble control circuit includes a signal generation circuit configured to generate a waveform signal, and a conversion circuit configured to convert a waveform of said waveform signal in accordance with the direction of the current flowing through said focusing coil.

5. The optical disk device according to claim 2, wherein said wobble control circuit includes a circuit configured to generate said third control signal indicating that said current value should fluctuate in a fixed cycle.

* * * * *